United States Patent [19]

Mazhar

[11] Patent Number: 4,607,886
[45] Date of Patent: Aug. 26, 1986

[54] TRUCK HEADREST

[76] Inventor: Mike S. Mazhar, 25472 Bunker Hill Blvd., Hayward, Calif. 94542

[21] Appl. No.: 781,468

[22] Filed: Sep. 30, 1985

[51] Int. Cl.$^4$ ............................................. A47C 7/36
[52] U.S. Cl. ..................... 297/410; 248/118; 297/395
[58] Field of Search ............ 297/410, 391, 399, 395, 297/396, 397, 400; 248/118

[56] References Cited

U.S. PATENT DOCUMENTS

| | | | |
|---|---|---|---|
| 195,842 | 10/1877 | Peckham | 297/395 |
| 856,025 | 6/1907 | Brown | 297/410 |
| 1,892,048 | 12/1932 | Genung | 248/118 |
| 3,253,859 | 5/1966 | Merriman et al. | 297/397 |
| 3,254,918 | 6/1966 | Barker | 297/397 |
| 3,366,417 | 1/1968 | Belk | 297/410 X |
| 3,429,615 | 2/1969 | Belk | 297/410 |
| 4,285,081 | 8/1981 | Price | 297/391 |

FOREIGN PATENT DOCUMENTS

| | | | |
|---|---|---|---|
| 1471224 | 1/1967 | France | 297/397 |
| 2483758 | 12/1981 | France | 297/395 |
| 5012646 | 5/1975 | Japan | 297/391 |

Primary Examiner—Francis K. Zugel
Attorney, Agent, or Firm—Douglas E. White

[57] ABSTRACT

Disclosed is a headrest including a cushion having a cushion support plate intersecting a cushion attachment surface at a first angle, a neck support plate intersecting the cushion support plate at a second angle, and a first head support plate intersecting the neck support plate at a third angle; a back plate attached to the attachment surface; and means for mounting the back plate.

9 Claims, 3 Drawing Figures

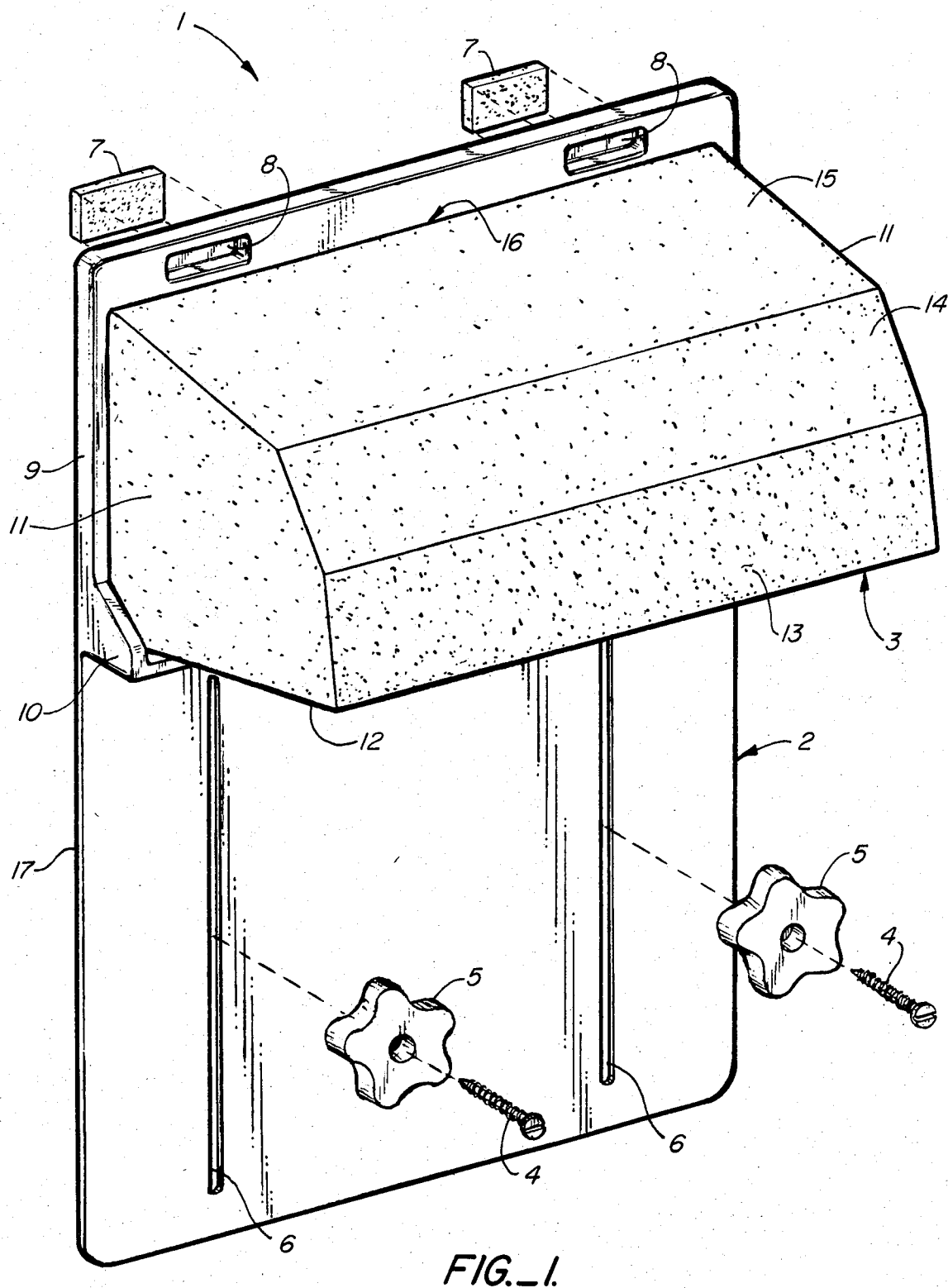
FIG._1.

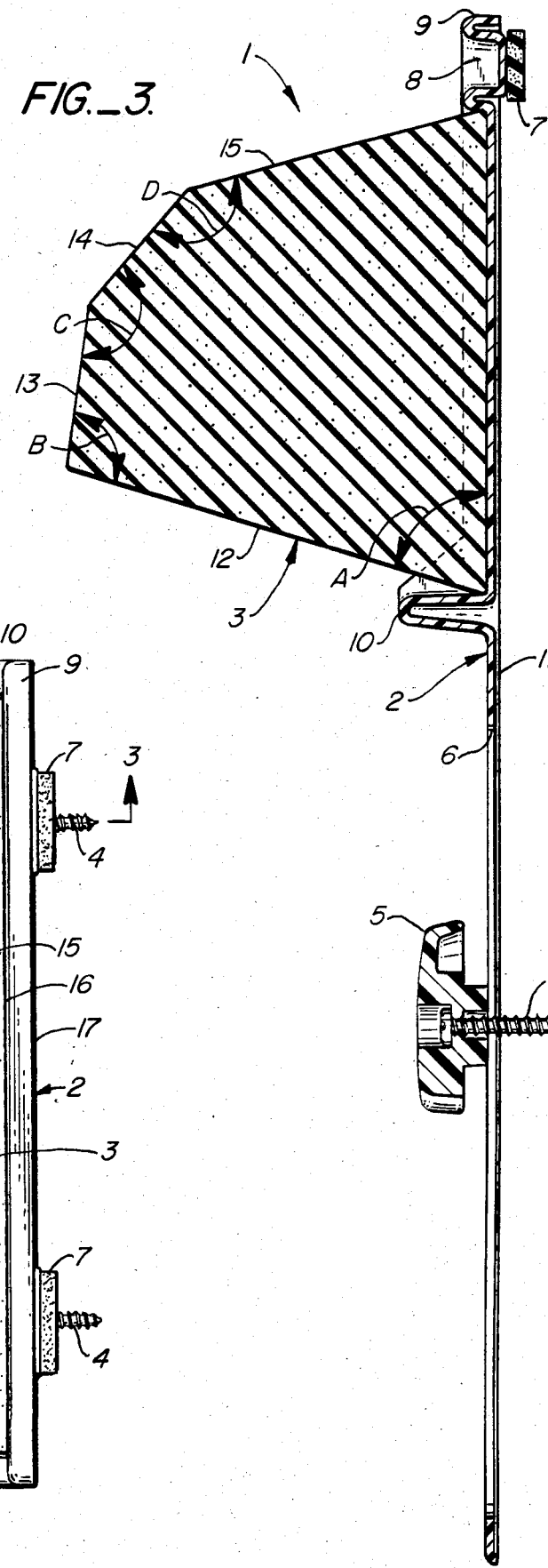
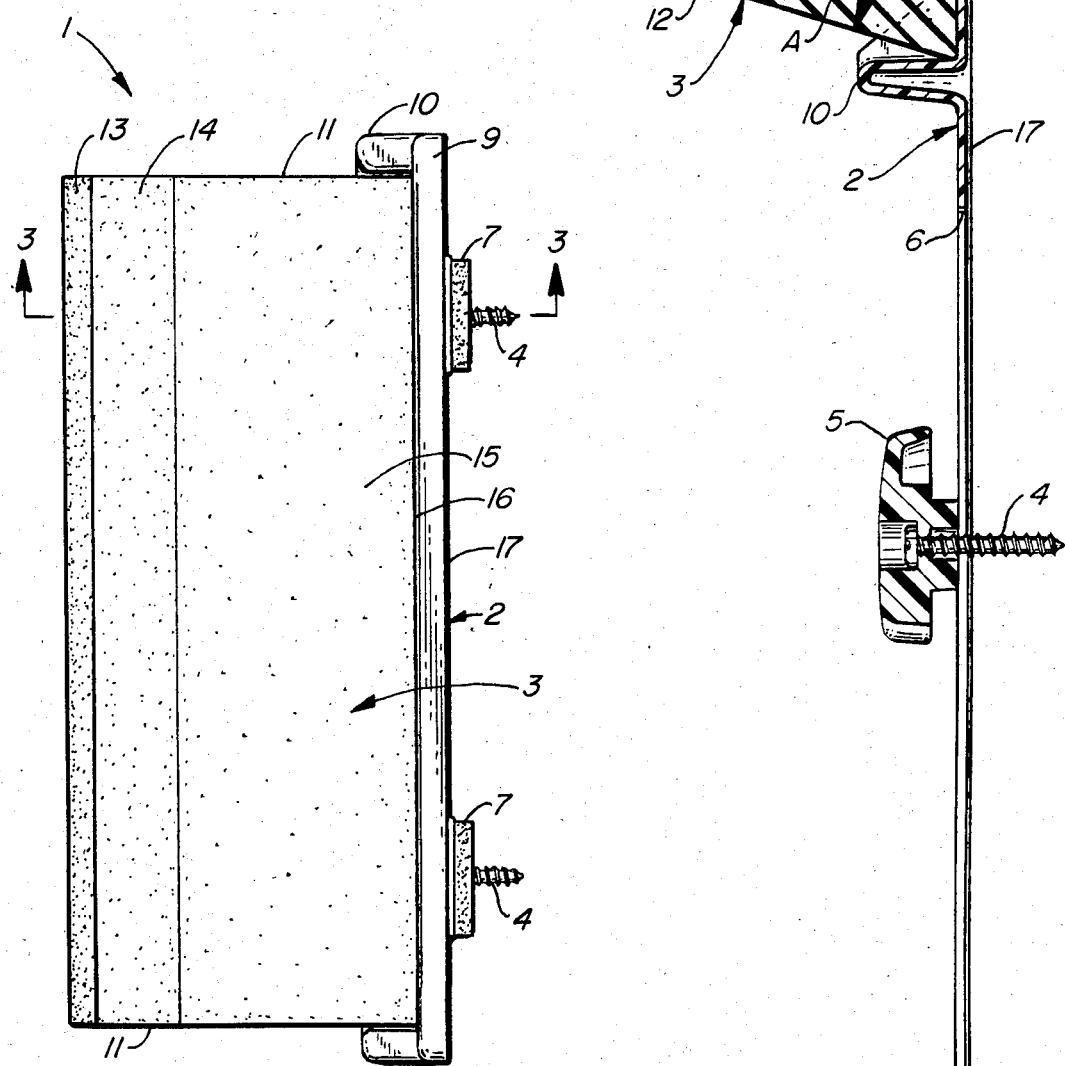
FIG._3.
FIG._2.

TRUCK HEADREST

FIELD OF THE INVENTION

This invention relates to support devices for the human head, more particularly to a truck headrest with a soft cushion which is supported by the rear panel of the truck cab in which it is installed and in part by the rear window of the truck.

BACKGROUND OF THE INVENTION

The increasing prevalence of small body pickup or utility trucks, which are typically manufactured without headrests or other support means for the heads of the driver and passengers, has created a need for an after-market headrest that can be easily installed by the truck owner.

A problem with designing headrests that are installable by truck users has been the difficulty of providing means for securely attaching the headrest in a manner that will allow the weight of the head to firmly contact the headrest without the headrest changing position or detaching itself over time.

The prevalent method of attaching headrests in the prior art has been to affix the headrest to the seat of the truck. One such device is described in a patent to W. F. Warlick et al., U.S. Pat. No. 2,983,310. The Warlick device attaches to the top of the seat back by means of a spring clamp. This solution suffers from such problems as unsightly permanent deformations of the seat by the clamp, a tendency to slide to one side under the weight of the head, and protrusion of the headrest outwardly from the designed contour of the seat back.

Another solution is to screw or bolt the headrest to the back of the seat, either at the top or at the rear of the seat back. This solution suffers from the following limitations. Holes must be drilled by the installer into the seat which permanently pierce the vinyl or cloth covering and can eventually spread to cause tears in the fabric. There exists no standard method of constructing the interior framework of seats, so it is difficult or impossible to design one headrest support plate which can be screwed to the interior frame of any seat. Additionally, such a device must be self supporting to the extent it extends upwardly from the seat, thus requiring the use of expensive rigid materials, such as metals.

SUMMARY OF THE INVENTION

The present invention is a truck headrest which may be installed by the user of a truck or similar vehicle after purchase of the truck. Unlike prior art devices, the present invention is installable onto the rear metal panel which is found at the back of the truck cab behind the seat itself. Directly above such panels typically lies the rear window of the truck. The present headrest, when installed, contacts the rear window with resilient pads for additional stability and support.

One object of the invention is to provide a headrest which is affordable as an after-market accessory. Although the invention could be constructed of metal, this design lends itself to construction with inexpensive and durable plastic materials.

Another object of the invention is to provide support means for the headrest which is not dependent upon adaptability to the myriad designs found in the inner frames of truck seats. This objective is achieved by screwing the headrest of the present invention to the rear panel of the truck, since this typically is a rigid metal support member which is uniformly planar in shape and is located directly behind the seat back on the vast majority of trucks currently marketed.

Another object of the invention is to provide a headrest which can be tightly attached in one position so as to provide reliable support to the user's head over long periods without altering the position of the headrest. Screws provided with knob grips can accomplish this end when used in conjunction with holes easily drilled into the rigid metal rear truck panel.

Yet another object of the invention is to provide attachment means which are adjustable so that the headrest may be raised or lowered, depending upon the individual height of the driver or passenger utilizing the headrest at any given time. Adjustment channels are provided which allow the screws to be loosened, the headrest raised or lowered, and the screws to be retightened at the new position. Adjustment sockets are provided in the preferred embodiment into which the user may insert his or her fingers to assist in moving the headrest from one position to another.

Yet another object of the invention is to provide a head support cushion which adapts to both the flat shape of the neck and the protruding portion of the rear of a user's head. A unique series of intersecting support plates is provided to conform to this shape of head and neck in a manner nowhere disclosed in the prior art.

Yet another object of the invention is to rely on the position of the rear window of the truck to provide additional, though not primary, support to the headrest. Resilient pads are affixed to the rear surface of the headrest which, when installed, lightly contact the rear window of the truck. These pads also prevent or reduce noise due to vibration.

Another object of the invention is to take advantage of the observed fact that the vast majority of small truck users keep their seats adjusted fully to the rear of the vehicle, or perhaps only one or two notches away from the rearmost position. The present device will adequately serve such users.

Yet another object of the invention is to provide a truck headrest which is easily installable by an unskilled individual using a minimum of tools. The device of the present invention may be installed by drilling two holes. Only a drill is required.

Other novel features which are characteristic of the invention, as to organization and method of operation, together with further objects and advantages thereof will be better understood from the following description considered in connection with the accompanying drawing in which a preferred embodiment of the invention is illustrated by way of example. It is to be expressly understood, however, that the drawing is for the purpose of illustration and description only and is not intended as a definition of the limits of the invention.

BRIEF DESCRIPTION OF THE DRAWING

FIG. 1 is an exploded perspective view of an embodiment of the headrest of the present invention;

FIG. 2 is a plan view of the top of the headrest of FIG. 1; and

FIG. 3 is a sectional view taken along the plane of line 3—3 of FIG. 2, showing a side elevation of the headrest of FIG. 1.

DESCRIPTION OF A PREFERRED EMBODIMENT

The invention will be described with respect to an embodiment which functions as a truck headrest, although it is to be understood that the invention is readily suited for use in other types of vehicles as well.

Referring to FIG. 1, there is shown therein a headrest generally designated as 1. Basically, the headrest 1 comprises a head cushion 3 attached at its rear attachment surface 16 to the headrest back plate 2.

The head cushion 3 can be constructed out of a variety of readily available materials such as fire rated vinyl skinned polyurethane foam or fabric covered polyurethane or other medium density plastic foam.

The back plate 2 is injection molded or thermal formed from suitable rigid plastic through standard industrial processes. In an alternate embodiment, back plate 2 can be constructed out of any combination of plastic, wood, metal or other rigid materials.

Back plate 2 is pierced by two linear adjustment channels 6. Through channels 6 may be inserted screws 4, which pass through knobs 5. The headrest is installed in a typical truck by drilling two holes into the rear panel of the truck cab (not illustrated), preferably into the cavity which is formed by the double wall construction of the cab body. Screws 4 are then screwed into the holes in the panel after first being passed through knobs 5 and channels 6. After installation, screws 4 may be permanently bonded to knobs 5 by glue or other suitable means.

Preferably, screws 4 are standard #12×1 or #12×1 ¼ slotted hex head sheet metal screws. Knobs 5 can be Model No. 2980, with a ¼-20 threaded steel insert, available from Harry Davies Molding Company of Chicago, Illinois. Channels 6 should be at least five inches in length to accommodate a minimum range of user heights, but should preferably be from about 8 to 13 inches in length. The preferred embodiment of headrest 1 is 12 inches wide in the direction perpendicular to the lines of the adjustment channels 6 in order to most comfortably conform to the expected range of individual head widths and positions thereof. In order that the headrest 1 may be installed in a wide range of trucks, wherein the cavity behind the rear panel may be located at various depths below the top of the truck seat (not illustrated), the length of headrest 1 in the direction parallel to the lines of channels 6 should be from about 17 to about 22 inches. The channels 6 should be 5/16 inch wide, both to accommodate screws 4 and to allow a pencil to be passed through them to mark the spots to drill installation holes.

Adjustment of the headrest 1, once installed, is accomplished by loosening screws 4 by means of turning knobs 5 counterclockwise. Adjustment sockets 8 are formed in the top of back plate 2 of a convenient size for the insertion of the user's fingers when moving the headrest up and down via the adjustment channels 6 when screws 4 are thus loosened. When the desired height is obtained, the knobs 5 are securely tightened by turning them clockwise. Since the knobs are of a pressure sensitive release type, tightening them results in the headrest 1 remaining securely in place when the weight of the head is placed on them for long periods of time.

Sockets 8 do not completely pierce the back plate 2 in a preferred embodiment, but terminate in the rear surface 17 of the back plate 2. This is done both to provide support for resilient pads 7 and to further strengthen the plate 2 in the area of the sockets 8. However, sockets 8 could completely pierce plate 2 without departing from the spirit and scope of the invention.

Pads 7, attached to back plate 2 by glue or other means, provide a cushioned resting surface for the headrest 1 against the rear window of the cab of the truck and prevent distracting vibration. Although additional support and stability is provided by the truck window in this manner, the primary means of support is through back plate 2 vis a vis the rear panel of the cab. Nevertheless, supporting the headrest against the vertical rear window of the truck is viewed as a significant innovation in the art.

Referring to FIGS. 2 and 3 in conjunction with FIG. 1, the unique functional design of head cushion 3 is illustrated. Cushion support plate 12 intersects rear cushion attachment surface 16 at an angle A, which subtends an arc of from about 80 to 90 degrees. Preferably, angle A is 74 degrees. With angle A in the preferred embodiment being slightly less than 90 degrees, the cushion support plate 12 directs both the force of gravity and the force of the user's head acting over time on the cushion towards the back plate 2, thus preventing permanent deformation of cushion 3 or possible detachment thereof from back plate 2.

Neck support plate 13 intersects cushion support plate 12 at an angle B of from about 90 to 100 degrees, preferably 97 degrees. This plate 13 contacts the nearly vertical, but slightly rearwardly inclined, neck of the user.

Plate 13 intersects head support plate 14 at an angle C of from about 140 to about 150 degrees, preferably 147 degrees. This plate 14 supports the rear bottom of the skull of the user at the point where it extends rearwardly from the neck at an even greater inclination from the vertical than does the neck. When the user's head and neck contact plates 13 and 14, both plates deform temporarily into a smooth curve with the principal point of application of force being located at the intersection of plates 13 and 14. Plates 13,14 intersect at a line which extends about 4¾ to 5 inches from back plate 2, measured perpendicularly from plate 2. This extension allows the user to comfortably adjust the vehicle seat one or two notches back without sacrificing the functionality of the headrest 1.

Plate 14 could extend back until it intersected with the plane of back plate 2 without departing from the scope of the invention. However, in a preferred embodiment, a supplementary head support plate 15 intersects head support plate 14 at an angle D of from about 140 to 150 degrees, preferably 148 degrees. Plates 12, 13, 14 and 15, together with attachment surface 16, form a septehedron bounded by the two planar cushion sides 11. When the rear of the skull of the user deforms plate 14 a significant amount due to more than merely light pressure, plates 14 and 15 deform to a smooth curve with the skull supported by a force which is centered at the point of intersection of plates 14 and 15.

The head cushion 3 is surrounded by protective flange 9 which is an integrally molded portion of back plate 2. This flange both adds rigidity to the back plate and protects fabric seams when cushion 3 is of the fabric covered type.

Flange 9 extends outwardly into a support flange 10 in its lower portion in the vicinity of the intersection of plate 12 with attachment surface 16. Support flange 10 provides additional support, protection and stability to the cushion in the area where the principal forces of gravity and head pressure are directed.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A headrest including:
   a cushion having
   a cushion support plate intersecting
   a cushion attachment surface at a first angle,
   a neck support plate intersecting the cushion support plate at a second angle, and
   a first head support plate intersecting the neck support plate at a third angle;
   a back plate attached to the attachment surface having
   a plurality of linear adjustment channels,
   at least one adjustment socket,
   a protective flange surrounding the perimeter of the cushion attachment surface, and
   a support flange extending outwardly from a bottom end of the protective flange adjacent to the cushion support plate;
   adjustable attachment means slidably engagable in the plurality of adjustment channels; and
   at least one resilient pad attached to a rear surface of the back plate.

2. The headrest of claim 1 further including:
   a supplementary head support plate intersecting the first head support plate at a fourth angle.

3. The headrest of claim 1 wherein:
   the first angle subtends from about 70 degrees to about 80 degrees,
   the second angle subtends from about 90 to about 100 degrees, and
   the third angle subtends from about 140 to about 150 degrees.

4. The headrest of claim 2 wherein:
   the fourth angle subtends from about 140 to about 150 degrees.

5. The headrest of claim 1 wherein:
   the adjustable attachment means is a plurality of screws each permanently affixable to one of each of a plurality of adjustment knobs.

6. The headrest of claim 1 wherein:
   the plurality of adjustment channels number 2,
   each adjustment channel has a length of at least 5 inches, and
   each adjustment channel has a width of at least 5/16 inches.

7. The headrest of claim 1 wherein:
   the back plate further has a length of from about 17 to about 22 inches and
   the back plate further has a width of about 12 inches.

8. The headrest of claim 1 wherein:
   the plurality of adjustment channels number 2,
   each adjustment channel has a length of at least 5 inches,
   each adjustment channel has a width of at least 5/16 inches,
   the back plate further has a length of from about 17 to about 22 inches, and
   the back plate further has a width of about 12 inches.

9. The headrest of claim 2 wherein:
   the first angle is 74 degrees,
   the second angle is 97 degrees,
   the third angle is 147 degrees, and
   the fourth angle is 148 degrees.

* * * * *